United States Patent
Ahn et al.

(10) Patent No.: US 9,137,432 B2
(45) Date of Patent: Sep. 15, 2015

(54) BACKSIDE ILLUMINATION IMAGE SENSOR, OPERATING METHOD THEREOF, IMAGE PROCESSING SYSTEM AND METHOD OF PROCESSING IMAGE USING THE SAME

(75) Inventors: Jung Chak Ahn, Yongin-si (KR); Bum Suk Kim, Hwaseong-si (KR); Jin Hak Kim, Seoul (KR); Tae Chan Kim, Yongin-si (KR); Alexander Getman, Suwon-si (KR); Sun-Kyu Kim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 308 days.

(21) Appl. No.: 13/616,340

(22) Filed: Sep. 14, 2012

(65) Prior Publication Data
US 2013/0076933 A1   Mar. 28, 2013

(30) Foreign Application Priority Data

Sep. 16, 2011 (KR) .................. 10-2011-0093528
Sep. 27, 2011 (KR) .................. 10-2011-0097465

(51) Int. Cl.
| H04N 5/228 | (2006.01) |
| H04N 5/235 | (2006.01) |
| H04N 5/353 | (2011.01) |
| H04N 5/378 | (2011.01) |

(52) U.S. Cl.
CPC ............ *H04N 5/228* (2013.01); *H04N 5/235* (2013.01); *H04N 5/3535* (2013.01); *H04N 5/378* (2013.01)

(58) Field of Classification Search
CPC .................................................. H04N 5/235
USPC ...................... 348/229.1, 255, 302
See application file for complete search history.

(56) References Cited

U.S. PATENT DOCUMENTS

| 7,671,316 B2 | 3/2010 | Kanai et al. |
| 7,746,397 B2 | 6/2010 | Nam |
| 7,848,569 B2 | 12/2010 | Hu |
| 7,915,574 B2 | 3/2011 | Kanai et al. |
| 7,915,576 B2 | 3/2011 | Kanai et al. |
| 7,982,174 B2 | 7/2011 | Kanai et al. |
| 2002/0180875 A1 | 12/2002 | Guidash |
| 2005/0035927 A1 | 2/2005 | Kimura |
| 2008/0094486 A1* | 4/2008 | Fuh et al. ............ 348/229.1 |

(Continued)

FOREIGN PATENT DOCUMENTS

| JP | 2004304706 A | 10/2004 |
| JP | 2005064828 A | 3/2005 |
| JP | 2007274632 A | 10/2007 |
| JP | 2009118430 A | 5/2009 |
| KR | 20060053327 | 5/2006 |

(Continued)

*Primary Examiner* — Joel Fosselman
(74) *Attorney, Agent, or Firm* — Harness, Dickey & Pierce, P.L.C.

(57) ABSTRACT

A backside illumination image sensor is provided. The backside illumination image sensor includes a plurality of different types of pixels, each pixel including a photodiode configured to accumulate photogenerated charges corresponding to light incident on a backside of a semiconductor substrate and a transfer transistor configured to transfer the photogenerated charges to a floating diffusion node; and a plurality of transfer lines disposed at a front side of the semiconductor substrate, the plurality of transfer lines connected to a gate of the transfer transistor of a respective one of the pixels, wherein transfer control signals respectively transmitted through the transfer lines produce different effective integration times in the pixels.

7 Claims, 13 Drawing Sheets

(56) References Cited

U.S. PATENT DOCUMENTS

2008/0309803 A1* 12/2008 Morita et al. ............... 348/255
2009/0073281 A1 3/2009 Ohno
2009/0213252 A1 8/2009 Kim et al.

FOREIGN PATENT DOCUMENTS

KR 20080078064 A 8/2008
KR 20090086698 A 8/2009

* cited by examiner

FIG. 5
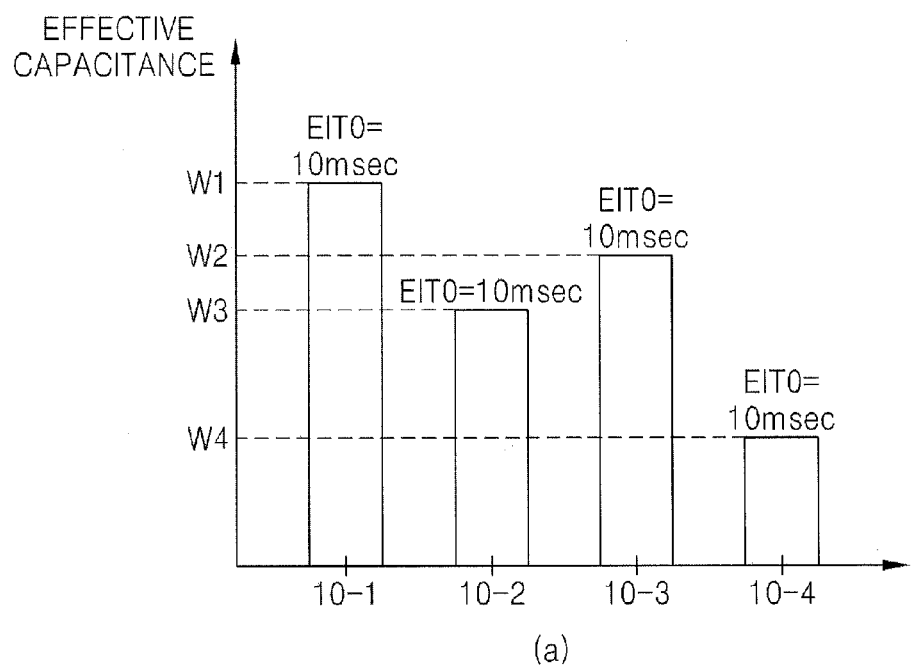
(a)
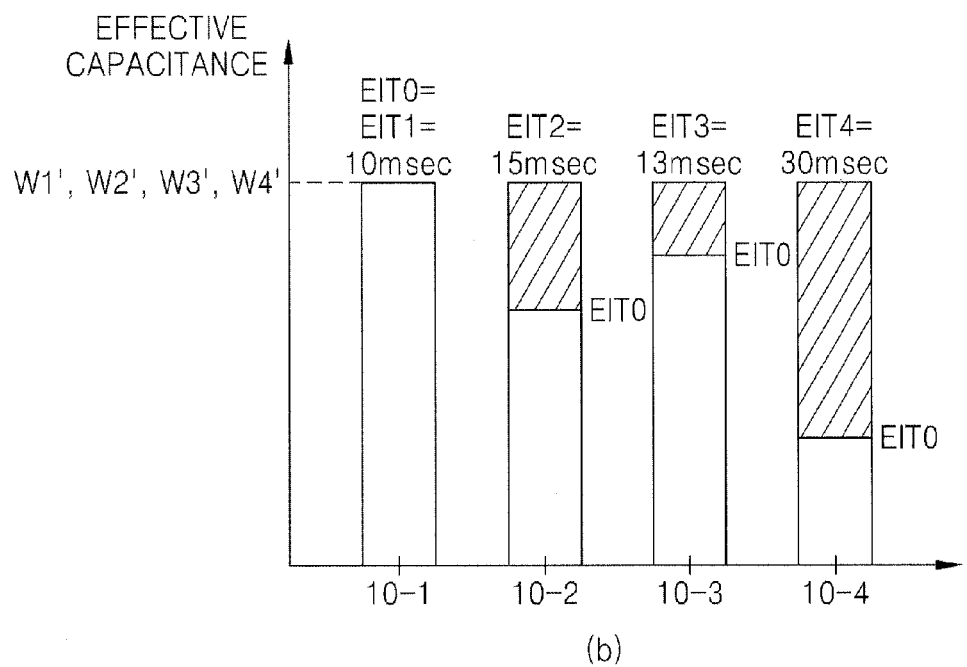
(b)

| R | G | R | G | R | G | R | G |
|---|---|---|---|---|---|---|---|
| B | W | B | W | B | W | B | W |
| R | G | R | G | R | G | R | G |
| B | W | B | W | B | W | B | W |
| R | G | R | G | R | G | R | G |
| B | W | B | W | B | W | B | W |

BACKSIDE ILLUMINATION IMAGE SENSOR, OPERATING METHOD THEREOF, IMAGE PROCESSING SYSTEM AND METHOD OF PROCESSING IMAGE USING THE SAME

CROSS-REFERENCE TO RELATED APPLICATIONS

This application claims priority under 35 U.S.C. §119 to Korean Patent Application No. 10-2011-0093528 filed on Sep. 16, 2011 and No. 10-2011-0097465 filed on Sep. 27, 2011 in the Korean Intellectual Property Office (KIPO), the entire contents of which are incorporated herein by reference.

BACKGROUND

1. Field

One or more example embodiments of the inventive concepts relate to a backside illumination image sensor. One or more other example embodiments of the inventive concepts relate to an image processing system.

2. Description of the Related Art

A complementary metal oxide semiconductor (CMOS) image sensor (CIS) includes a plurality of pixels. The CIS converts an optical image signal detected by each of the pixels into an electrical image signal. The CIS includes a plurality of MOS transistors corresponding to a pixel, and detects and processes an output signal of the pixel using the MOS transistors. More specifically, each pixel includes a photodiode for detecting an incident optical image signal and a plurality of MOS transistors for converting the optical image signal into an electrical image signal.

The CIS is driven using the simpler method than a charge-coupled device (CCD) image sensor and can employ various scanning methods. In addition, circuits for processing signals output from pixels are integrated into a single chip using a CMOS process. Therefore, the CIS has the advantages of having a relatively small size, low manufacturing cost, and low power consumption when compared to a CCD image sensor.

One such single chip technique includes integrating an analog-to-digital converter (ADC) that converts an analog signal output from a pixel array into a digital signal and an image signal processor (ISP) that processes the digital signal output from the ADC into an image signal into a single chip.

In high-illumination environments, the average brightness of a frame defined by frame data output from an image sensor has a very big value. Contrarily, in a low-illumination environment, the average brightness of a frame output from the image sensor has a very small value.

Accordingly, it is difficult to process an electrical image signal, i.e., frame data output from the image sensor in the high- or low-illumination environments. In addition, pixels in the image sensor may have different sensitivity, and therefore, it may occur that only some of the pixels are saturated.

SUMMARY

According to some embodiments of the inventive concepts, there is provided a backside illumination image sensor including a plurality of different types of pixels, each pixel including, a photodiode configured to accumulate photogenerated charges corresponding to light incident on a backside of a semiconductor substrate and a transfer transistor configured to transfer the photogenerated charges to a floating diffusion node; and a plurality of transfer lines disposed at a front side of the semiconductor substrate, the plurality of transfer lines respectively connected to gates of the transfer transistors of the pixels, wherein transfer control signals respectively transmitted through the transfer lines may produce different effective integration times in the pixels.

The different effective integration times may be adjusted by a command generated by an image signal processor. The image signal processor may be implemented in a separate chip.

The plurality of pixels may include a white pixel, a blue pixel, a red pixel and a green pixel. The white, blue, red and green pixels may have a same effective capacitance accumulated in their respective photodiodes.

The image signal processor may be configured to comparing current image signals output from each of the pixels in a current frame and determine the effective integration times of the pixels by analyzing a comparison result. The image signal processor may be configured to determine the effective integration times for the pixels by comparing effective capacitances corresponding to the respective current image signals output from the pixels in the current frame.

Alternatively, the image signal processor may be configured to determine the effective integration times of the pixels by comparing current image signals output from the pixels in a current frame with previous image signals output from the pixels in a previous frame and analyze a comparison result. The image signal processor may be configured to determine the effective integration times for the pixels by comparing effective capacitances corresponding to the current image signals output from the pixels in the current frame with effective capacitances corresponding to the previous image signals output from the pixels.

According to other embodiments of the inventive concepts, there is provided a method of operating a backside illumination image sensor. The method includes comparing image signals output from a plurality of different types of pixels to determine an original effective capacitance of each of the pixels based on a comparison result; determining effective integration times for each pixel based on the comparing to produce a modified effective capacitance for each of the pixels such that the modified effective capacitance for each of the pixels is the same; and generating transfer control signals for the pixels, the transfer control signals respectively producing the determined effective integration times.

The determining the effective integration times may include comparing current image signals output from the pixels for a current frame and analyzing a comparison result, using an image signal processor.

Alternatively, the determining effective integration times may include comparing current image signals output from the pixels in a current frame with previous image signals output from the pixels in a previous frame and analyzing a comparison result, using an image signal processor.

According to further embodiments of the inventive concepts, there is provided an image processing system including an image sensor configured to convert an optical image signal received from an object into electrical image data and output frame data; and an image signal processor configured to receive the frame data, calculate an average brightness of a frame defined by the frame data, and output a brightness control signal to control a brightness of a next frame based on the average brightness, such that the brightness of a next frame data output by the image sensor is adjusted in response to the brightness control signal.

The image sensor may adjust a charge integration time in response to the brightness control signal to adjust the brightness of the next frame. The image signal processor may include a statistics module configured to calculate the average brightness of the frame and a control signal generation module configured to generate the brightness control signal according to a comparison of the average brightness with a reference brightness.

The image processing system may be a digital single-lens reflex camera or a handheld device. The image sensor and the image signal processor may be packaged in a single package.

In other embodiments, an image processing method of an image processing system includes the converting an optical image signal received from an object into electrical image data to generate frame data; calculating an average brightness of a frame defined by the frame data; and outputting a brightness control signal to control a brightness of a next frame based on the average brightness, such that the brightness of a next frame is adjusted in response to the brightness control signal; and outputting the next frame data whose brightness has been adjusted in response to the brightness control signal.

The calculating the average brightness and outputting the brightness control signal may include calculating the average brightness of the frame using the frame data; and comparing the average brightness of the frame with a reference brightness and outputting the brightness control signal for controlling the brightness of the next frame according to a comparison result.

In other example embodiments, there is provided a backside illumination image sensor including a plurality of pixels and a plurality of transfer lines. Each pixel being one of a plurality of pixel types, and including a photodiode configured to accumulate photogenerated charges corresponding to light incident on a semiconductor substrate, an amount of the accumulate photogenerated charges varying based on an effective capacitance of the respective photodiodes. Each transfer line configured to transfer a transfer control signal for each pixel type to a gate of the transfer transistor of a respective one of the pixels, the transfer controls signal for each pixel type producing an effective integration time in the respective pixel.

BRIEF DESCRIPTION OF THE DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

FIGS. 5A and 5B are graphs showing the effective capacitances of the different types of pixels illustrated in FIG. 1;

FIG. 11 is a plan view of a pixel array illustrated in FIG. 10;

DETAILED DESCRIPTION

Figure 1:
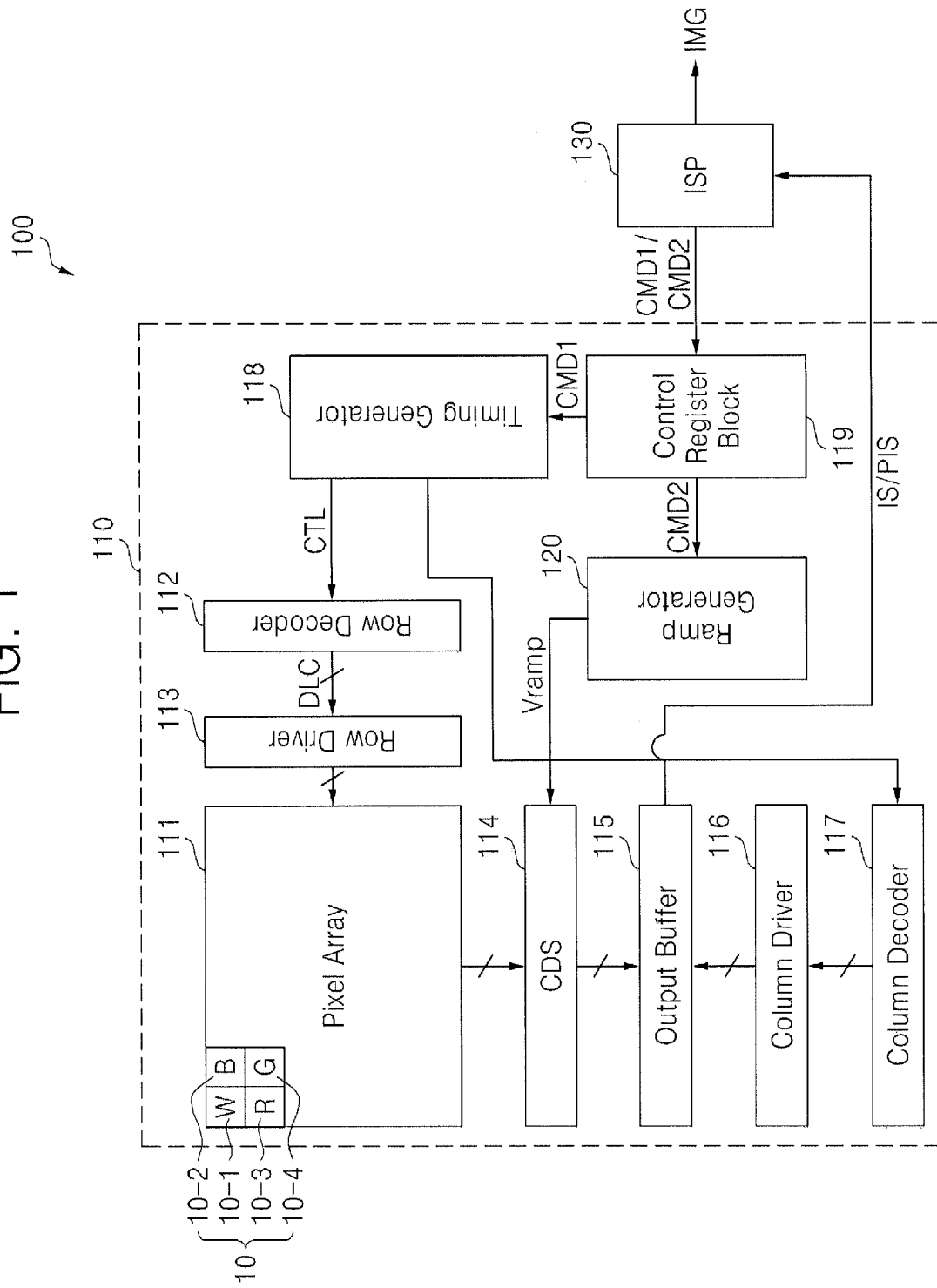
FIG. 1 is a schematic block diagram of a backside illumination image sensor according to some embodiments of the inventive concepts.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

FIG. 1 is a schematic block diagram of a back-illuminated (BI) or backside illumination (BSI) image sensor 100 according to some example embodiments of the inventive concepts. The BSI image sensor 100 may include an image signal generation circuit 110 and an image signal processor (ISP) 130. The image signal generation circuit 110 and the ISP 130 may be implemented in separated chips, respectively, or may be implemented in a single package, e.g., a multi-chip package.

The image signal generation circuit 110 may generate an image signal corresponding to an object based on incident light. The image signal generation circuit 110 may include a pixel array 111, a row decoder 112, a row driver 113, a correlated double sampling (CDS) block 114, an output buffer 115, a column driver 116, a column decoder 117, a timing generator 118, a control register block 119, and a ramp generator 120.

The pixel array 111 may include a plurality of basic pixel blocks 10 arranged in a matrix form. The basic pixel block 10 may be implemented in an n×m (where n=m or n≠m and "n" and "m" are natural numbers) matrix.

The basic pixel block 10 may include a white pixel 10-1 which is configured to convert light in the white spectrum into an electrical signal, a blue pixel 10-2 which is configured to convert light in the blue spectrum into an electrical signal, a red pixel 10-3 which is configured to convert light in the red spectrum into an electrical signal, and a green pixel 10-4 which is configured to convert light in the green spectrum into an electrical signal.

Figure 3:
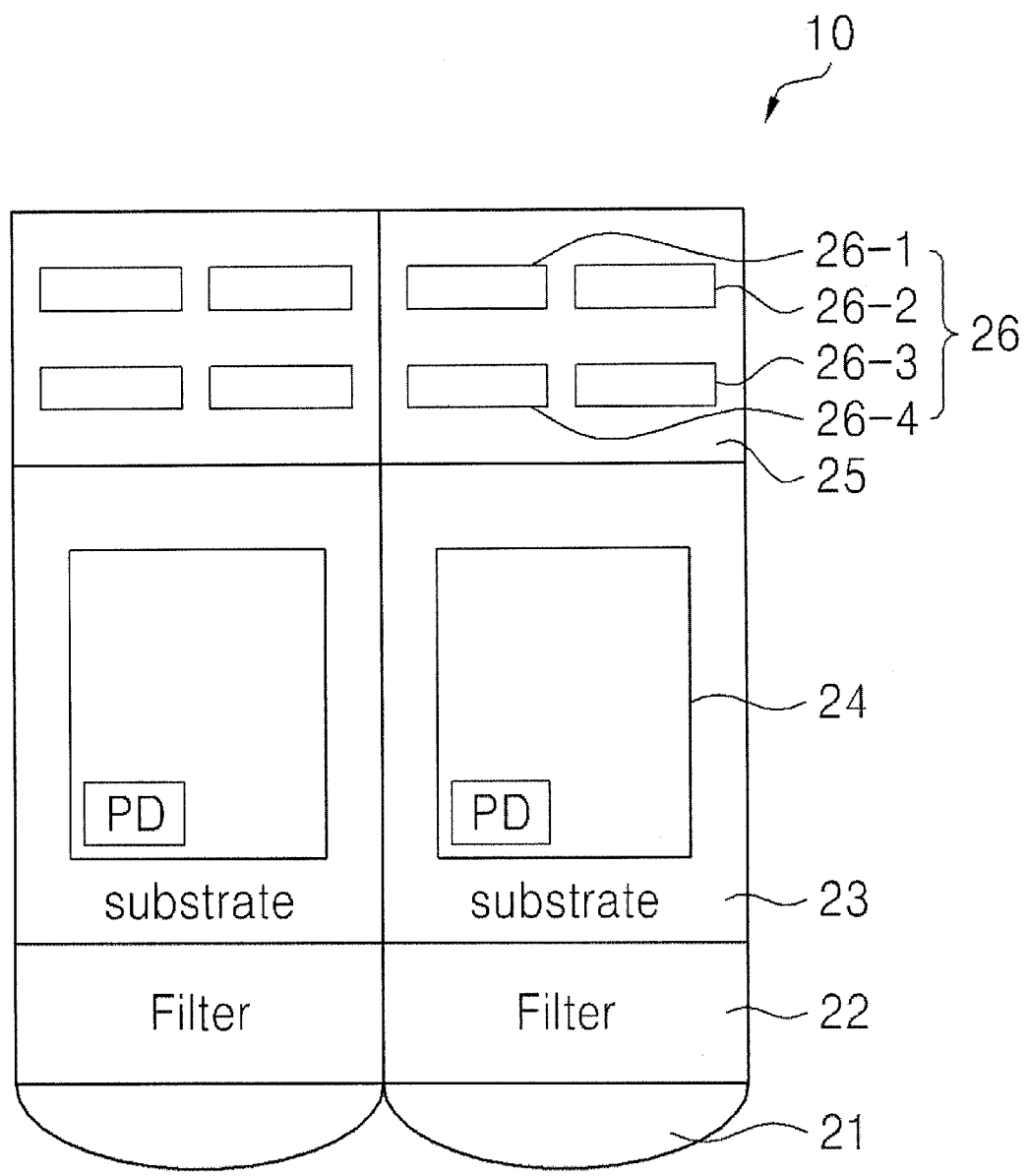
FIG. 3 is a cross-sectional view of basic pixel block illustrated in FIG. 1.

As shown in FIG. 3, at the bottom of each pixel of the basic pixel block 10 may be disposed a color filter 22 which is configured to selectively transmit light in a particular spectrum.

Each of the white pixel 10-1, the blue pixel 10-2, the red pixel 10-3, and the green pixel 10-4 may have a different sensitivity to light. As shown in FIG. 5A, these different sensitivities to light may result in each of the white pixel 10-1, the blue pixel 10-2, the red pixel 10-3, and the green pixel 10-4 of the basic pixel block 10 having a different effective capacitance, if a period of time during which photogenerated charges are accumulated at a photodiode PD included in each of the pixels, known as an effective integration time, are the same for each of the pixels.

To correct these differences in effective capacitances, the image signal processor (ISP) 130 may be configured to generate a control signal CMD1 which may be used to adjust the effective integration time such that the effective capacitance of each of pixels 10-1, 10-2, 10-3 and 10-4, and thus their sensitivity to light, are the same.

The row decoder 112 is configured to decode a plurality of row control signals CTL including row addresses output from the timing generator 118 and produce decoded row control signals DLC. The row driver 113 is configured to output a plurality of driving signals for driving the pixel array 111 in response to the decoded row control signals DLC.

For instance, the row driver 113 may output transfer control signals (TS1, TS2, TS3 and TS4 shown in FIG. 2) having different effective integration times in response to the decoded row control signals DLC. Here, effective integration time is a period of time during which photogenerated charges are accumulated at a photodiode PD included in each pixel of the basic pixel block 10.

The CDS block 114 performs correlated double sampling CDS on a pixel signal output from a pixel connected to each of a plurality of column lines (not shown) included in the pixel array to generate a CDS signal, compares the CDS signal with a ramp signal Vramp output from the ramp generator 120, and outputs a digital signal corresponding to a result of the comparison.

The output buffer 115 buffers digital signals output from the CDS block 114 in response to a plurality of output control signals received from the column driver 116 and outputs buffered signals to the ISP 130.

The column driver 116 transmits a plurality of select signals output from the column decoder 117 to the output buffer 115 as the output control signals. The column decoder 117 decodes addresses output from the timing generator 118, thereby generating the select signals.

The timing generator 118 may control the operation of at least one of the pixel array 111, the row decoder 112, the output buffer 115, the column decoder 117 and the ramp generator 120 according to a command output from the control register block 119.

For instance, the timing generator 118 may output a row control signal CTL for controlling effective integration time during which photogenerated charges are accumulated at a photodiode included in each pixel of the basic pixel block 10 according to a first command CMD1 output from the control register block 119.

The control register block 119 is configured to transmit the first command CMD1 output from the ISP 130 to the timing generator 118 and a second command CMD2 output from the ISP 130 to the ramp generator 120.

The ramp generator 120 is configured to output the ramp signal Vramp to the CDS block 114 in response to the second command CMD2 received from the control register block 119.

The ISP 130 is configured to process an image signal IS or PIS output from the output buffer 115 and generates an image IMG corresponding to an object. The ISP 130 also is configured to analyze the image signal IS output from the output buffer 115 and output to the control register block 119 the first command CMD1 for adjusting effective integration time of the pixels 10-1, 10-2, 10-3 and 10-4 according to a result of the analysis.

Figure 2:
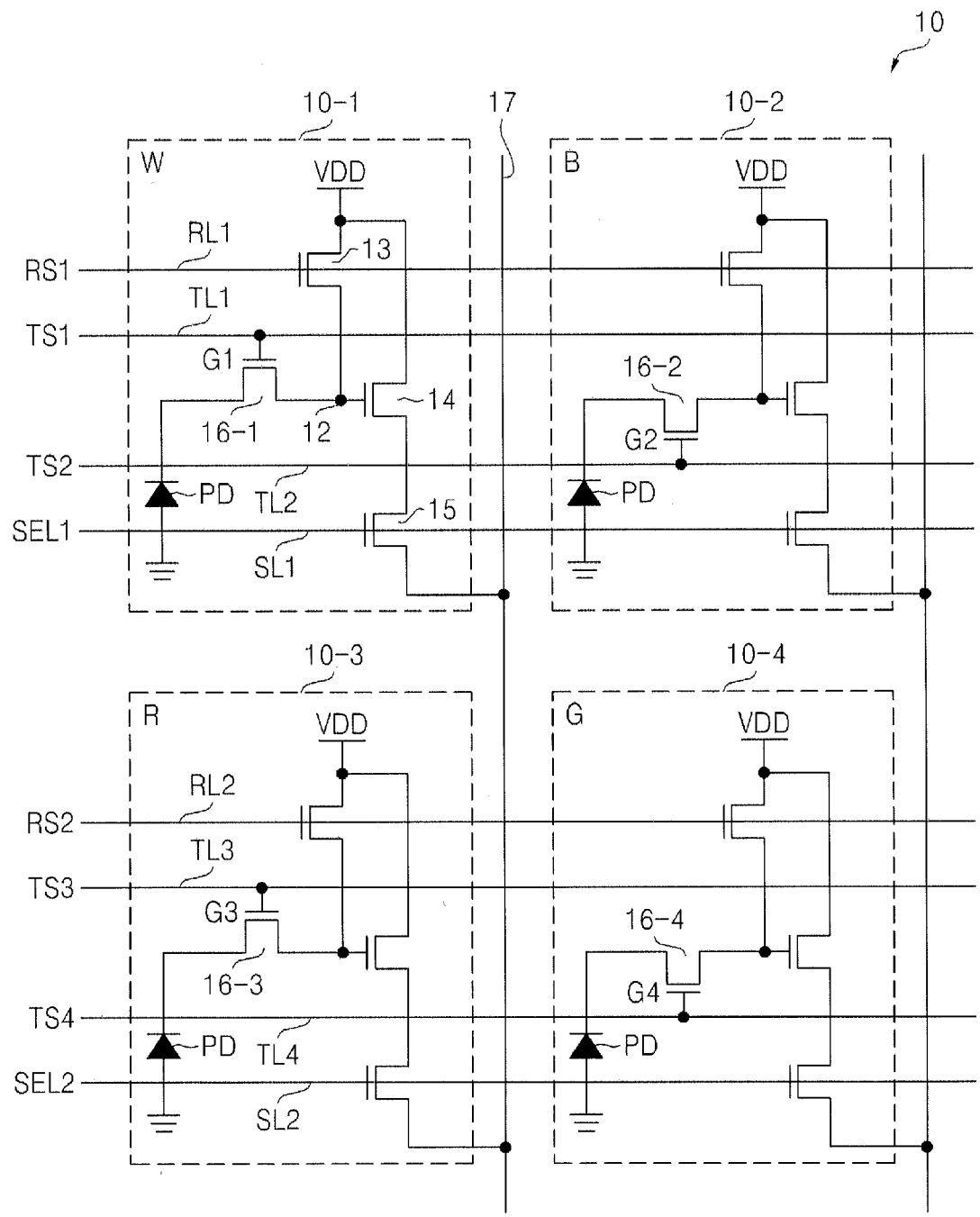
FIG. 2 is a circuit diagram of basic pixel block included in a pixel array illustrated in FIG. 1.

FIG. 2 is a circuit diagram of the basic pixel block 10 included in the pixel array 111 illustrated in FIG. 1. Referring to FIGS. 1 and 2, each of the pixels 10-1, 10-2, 10-3 and 10-4 may include a photodiode PD, a floating diffusion node 12, a reset transistor 13, a drive transistor 14, a select transistor 15 and a transfer transistor 16-1, 16-2, 16-3 or 16-4.

The pixels 10-1, 10-2, 10-3 and 10-4 are configured to operate in response to the transfer control signals TS1, TS2, TS3 and TS4, respectively.

In detail, a gate G1 of the first transfer transistor 16-1 of the white pixel 10-1 is connected to a first transfer line TL1 and is controlled by the first transfer control signal TS1. A gate G2 of the second transfer transistor 16-2 of the blue pixel 10-2 is connected to a second transfer line TL2 and is controlled by the second transfer control signal TS2.

A gate G3 of the third transfer transistor 16-3 of the red pixel 10-3 is connected to a third transfer line TL3 and is controlled by the third transfer control signal TS3. A gate G4 of the fourth transfer transistor 16-4 of the green pixel 10-4 is connected to a fourth transfer line TL4 and is controlled by the fourth transfer control signal TS4. The transfer control signals TS1, TS2, TS3 and TS4 may be generated by the row decoder 112 and provided by the row driver 113 to the pixel array 111.

The photodiode PD included in each of the pixels 10-1, 10-2, 10-3 and 10-4 is configured to accumulate photogenerated charges in response to incident light. Each of the pixels 10-1, 10-2, 10-3 and 10-4 may have different effective integration time during which the photodiode PD accumulates photogenerated charges therein.

Each of the transfer transistors 16-1, 16-2, 16-3 and 16-4 are configured to transfer the photogenerated charge accumulated at the photodiode PD to the floating diffusion node 12 in response to each of the transfer control signal TS1, TS2, TS3 or TS4.

The reset transistor 13 connected between a power supply line configured to supply a voltage VDD and the floating diffusion node 12 is configured to reset the floating diffusion node 12 in response to a reset signal RS1 or RS2.

The drive transistor 14 functioning as a source follower is configured to operate in response to a voltage of the floating diffusion node 12.

The respective select transistor 15 of the pixels 10-1 and 10-3 are configured to respectively output signals of the respective pixels 10-1 and 10-3 to a column line 17 in response to select signals SEL1 and SEL2, respectively. The respective select transistor 15 of the pixels 10-2 and 10-4 are configured to respectively output signals of the respective pixels 10-1 and 10-3 to another column line in response to the select signals SEL1 and SEL2, respectively. The signals RS1, RS2, SEL1 and SEL2 may be generated by the row decoder 112 and provided by the row driver 113 to the pixel array 111.

FIG. 3 is a cross-sectional view of the basic pixel block 10 illustrated in FIG. 1. Referring to FIGS. 1 through 3, each of the pixels 10-1, 10-2, 10-3 and 10-4 may include a microlens 21, a filter 22, a pixel circuit region 24, a semiconductor substrate 23, a dielectric layer 25, and a plurality of metals 26.

The microlens 21 is configured to focus light incident through the backside of the semiconductor substrate 23 on the pixel circuit region 24. The filter 22 may be a color filter which is configured to transmit wavelengths only in the visible spectrum among wavelengths in the light incident through the microlens 21 or an infrared filter which is configured to transmit wavelengths only in the infrared spectrum among the wavelengths in the incident light. The filter 22 may be a white, blue, red or green filter.

The semiconductor substrate 23 may include the pixel circuit region 24, which may include a photodiode PD.

The dielectric layer 25 may be formed on the semiconductor substrate 23 which may also include the pixel circuit region 24 mentioned above. The dielectric layer 25 may be formed of an oxide layer or a composite layer of an oxide layer and a nitride layer.

The plurality of metals 26 may be disposed within the dielectric layer 25 and may be configured to function as electrical wiring for the photo detection of each of the pixels 10-1, 10-2, 10-3 and 10-4. The metals 26 and the filter 22 may be disposed at opposite sides, respectively, of the semiconductor substrate 23.

For instance, the first metal 26-1 may function as the first transfer line TL1 that transfers the first transfer control signal TS1 to the gate G1 of the first transfer transistor 16-1, the second metal 26-2 may function as the second transfer line TL2 that transfers the second transfer control signal TS2 to the gate G2 of the second transfer transistor 16-2, the third metal 26-3 may function as the third transfer line TL3 that transfers the third transfer control signal TS3 to the gate G3 of the third transfer transistor 16-3, and the fourth metal 26-4 may function as the fourth transfer line TL4 that transfers the fourth transfer control signal TS4 to the gate G4 of the fourth transfer transistor 16-4.

Figure 4:
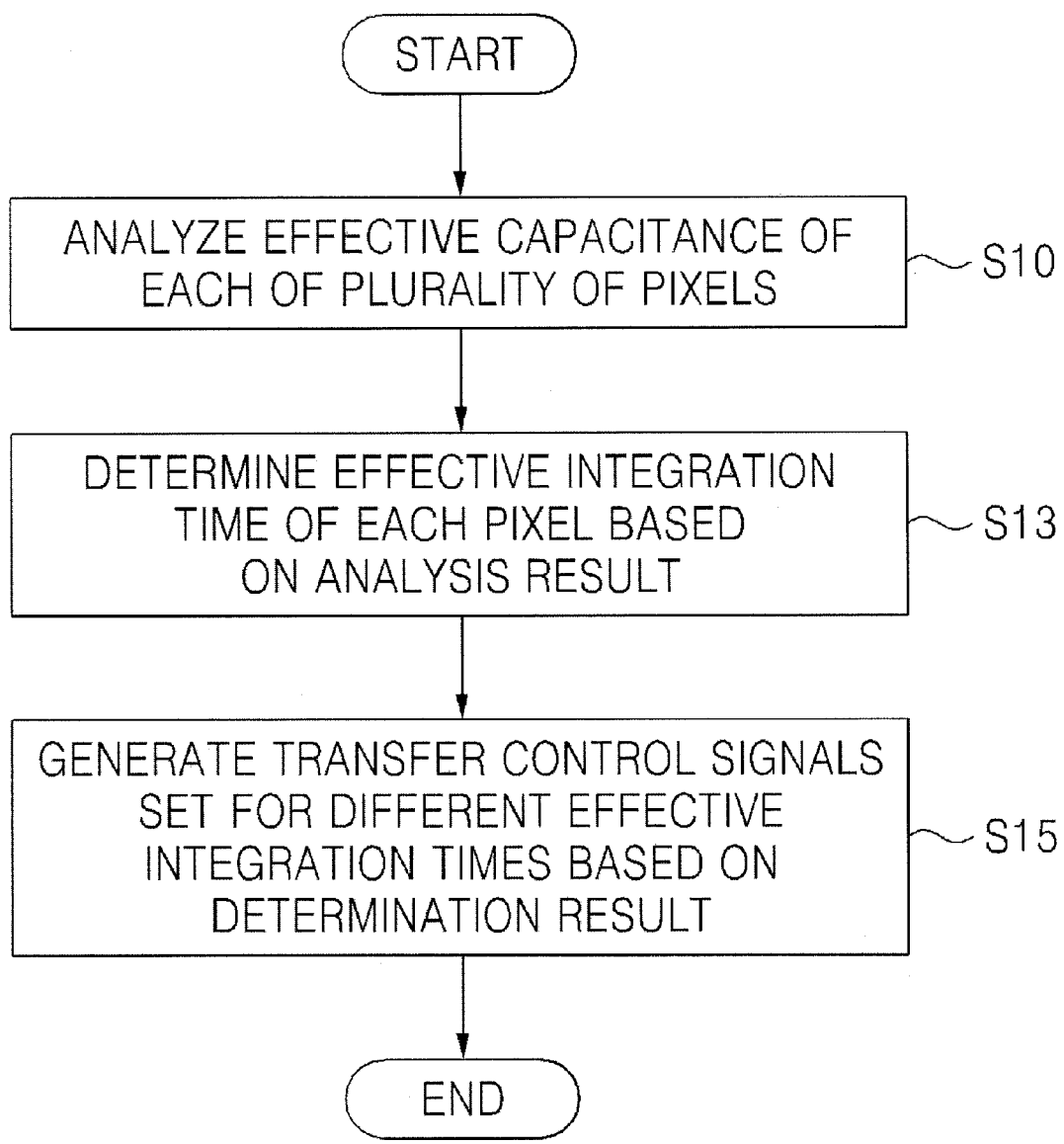
FIG. 4 is a flowchart of an operating method of the backside illumination image sensor illustrated in FIG. 1 according to some embodiments of the inventive concepts.

FIG. 4 is a flowchart of an operating method of the BSI image sensor 100 illustrated in FIG. 1 according to one or more example embodiments of the inventive concepts. FIGS. 5A and 5B are graphs showing the effective capacitances of the pixels 10-1, 10-2, 10-3 and 10-4 illustrated in FIG. 1. FIG. 5A shows effective capacitances (or amount) W1, W2, W3 and W4 of the respective pixels 10-1, 10-3, 10-2 and 10-4 before effective capacitance adjustment. FIG. 5B shows effective capacitances W1', W2', W3' and W4' of the respective pixels 10-1, 10-3, 10-2 and 10-4 after the effective capacitance adjustment.

Here, the effective capacitance (amount) of each of the pixels 10-1, 10-2, 10-3 and 10-4 is the amount of photogenerated charges that are accumulated at the photodiode PD in each pixel 10-1, 10-2, 10-3 or 10-4 during an effective integration time. At this time, the transfer transistors 16-1 through 16-4 are in an off state.

Referring to FIGS. 1 through 5B, the ISP 130 is configured to compare image signals IS output from the output buffer 115 and analyze the effective capacitance (amount) of each of the pixels 10-1, 10-2, 10-3 and 10-4 included in a basic pixel block 10 according to the comparison result in operation S10.

The ISP 130 is configured to determine (or calculate) the effective integration time of each of the pixels 10-1, 10-2, 10-3 and 10-4 based on the analysis result in operation S13. The effective integration time of each of the pixels 10-1, 10-2, 10-3 and 10-4 is determined by the ISP 130. When determining the effective integration time of each of the pixels 10-1, 10-2, 10-3 and 10-4, the ISP 130 may compare current image signals IS output from the respective pixels 10-1, 10-2, 10-3 and 10-4 for a current frame to each other, analyze the comparison result, and determines the effective integration time of each of the pixels 10-1, 10-2, 10-3 and 10-4 based on the analysis result.

Alternatively, when determining the effective integration time of each of the pixels 10-1, 10-2, 10-3 and 10-4, the ISP 130 may compare a current image signal IS output from each of the pixels 10-1, 10-2, 10-3 and 10-4 for the current frame with a previous image signal PIS output from each pixel 10-1, 10-2, 10-3 or 10-4 for a previous frame, analyze the comparison result, and determine the effective integration time of each of the pixels 10-1, 10-2, 10-3 and 10-4 based on the analysis result.

Referring to FIG. 5A, if the same effective integration time EIT0, i.e., 10 msec is applied to the white, blue, red and green pixels 10-1, 10-2, 10-3 and 10-4, respectively, according to a result of analyzing the current image signals IS, then the effective capacitance W1 of the white pixel 10-1, the effective capacitance W3 of the blue pixel 10-2, the effective capacitance W2 of the red pixel 10-3 and the effective capacitance W4 of the green pixel 10-4 are different from one another.

Referring to FIG. 5B, the ISP 130 determines the effective integration time EIT1 of the white pixel 10-1 to be 10 msec, the effective integration time EIT2 of the blue pixel 10-2 to be 15 msec, the effective integration time EIT3 of the red pixel 10-3 to be 13 msec, and the effective integration time EIT4 of the green pixel 10-4 to be 30 msec according to a result of analyzing the image signals IS and PIS so that the effective capacitance W1' of the white pixel 10-1, the effective capacitance W3' of the blue pixel 10-2, the effective capacitance W2' of the red pixel 10-3 and the effective capacitance W4' of the green pixel 10-4 are the same as one another.

Based on the determination result, the ISP 130 may output the first command CMD1 for controlling the effective integration time of each of the pixels 10-1, 10-2, 10-3 and 10-4 to the control register block 119. The first command CMD1 includes information about the effective integration times EIT1 through EIT4 determined by the ISP 130.

The control register block 119 may transmit the first command CMD1 output from the ISP 130 to the timing generator 118. The timing generator 118 may generate the row control signals CTL for controlling the row decoder 112 according to the first command CMD1 received from the control register block 119. The row control signals CTL include the information about the effective integration times EIT1 through EIT4 determined by the ISP 130.

The row decoder 112 decodes the row control signals CTL received from the timing generator 118. The row driver 113 generates the transfer control signals TS1, TS2, TS3 and TS4 including the effective integration times EIT1, EIT2, EIT3 and EIT4, respectively, in response to the decoded row control signals DLC and outputs the transfer control signals TS1 through TS4 to the pixels 10-1, 10-2, 10-3 and 10-4, respectively, in operation S15.

Figure 6:
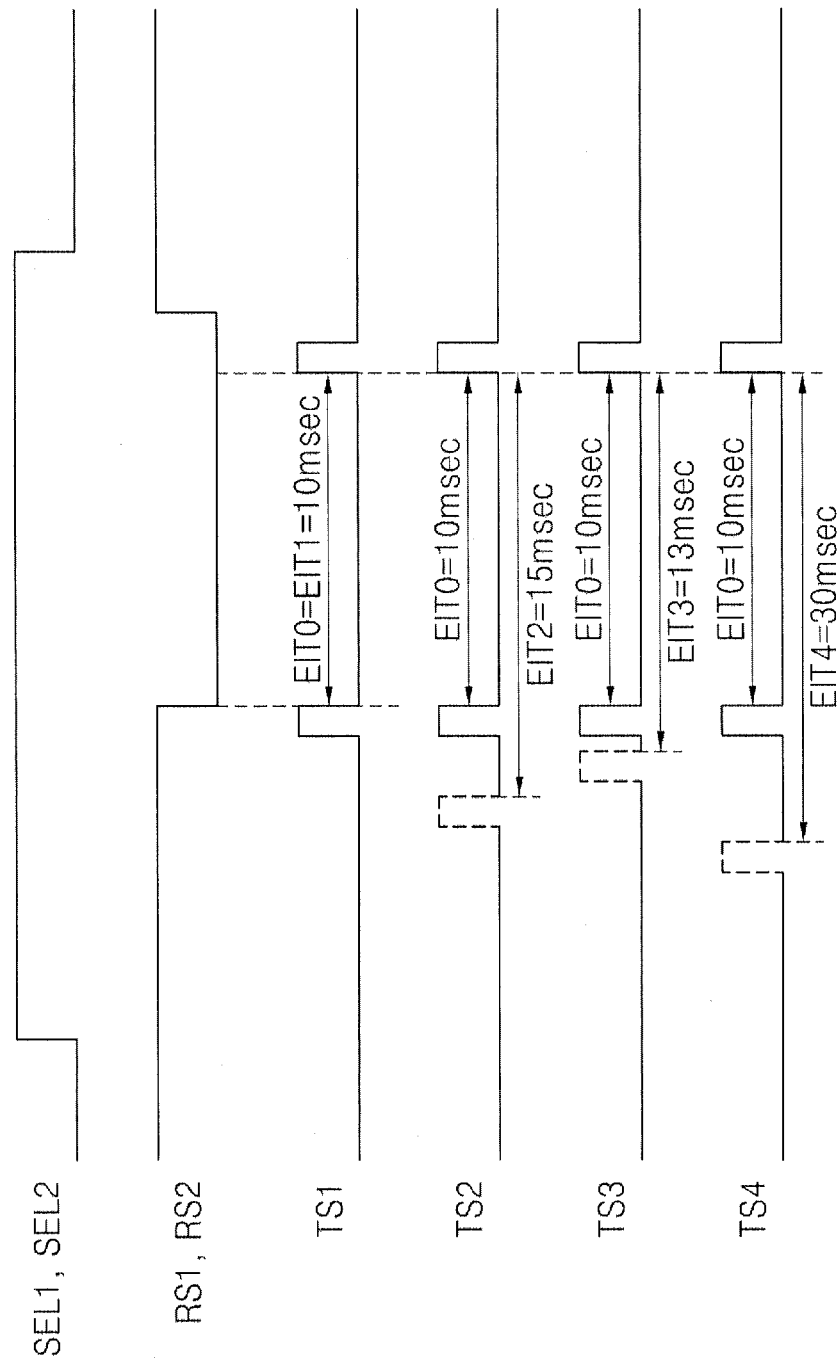
FIG. 6 is a timing chart showing the operation of the backside illumination image sensor illustrated in FIG. 1.

FIG. 6 is a timing chart showing the operation of the BSI image sensor 100 illustrated in FIG. 1. Referring to FIGS. 1 through 6, when the first select signal SEL1 and the reset signal RS1 output from the row driver 113 are provided to the white pixel 10-1 and the blue pixel 10-2 and the second select signal SEL2 and the rest signal RS2 output from the row driver 113 are provided to the red pixel 10-3 and the green pixel 10-4, the floating diffusion node 12 in each of the pixels 10-1, 10-2, 10-3 and 10-4 is reset.

In the example timing chart of FIG. 6, the row driver 113 transmits the first transfer control signal TS1 with the effective integration time EIT1 of 10 msec to the white pixel 10-1, the second transfer control signal TS2 with the effective integration time EIT2 of 15 msec to the blue pixel 10-2, the third transfer control signal TS3 with the effective integration time EIT3 of 13 msec to the red pixel 10-3, and the fourth transfer control signal TS4 with the effective integration time EIT4 of 30 msec to the green pixel 10-4.

Each of the pixels 10-1, 10-2, 10-3 and 10-4 accumulates photogenerated charges using the photodiode PD during the effective integration time EIT1, EIT2, EIT3 or EIT4 in response to the transfer control signal TS1, TS2, TS3 or TS4 with the effective integration time EIT1, EIT2, EIT3 or EIT4, respectively. Accordingly, as illustrated in FIG. 5B, the effective capacitances W1', W3', W2' and W4' of photogenerated charges accumulated at the photodiodes PD of the respective pixels 10-1, 10-2, 10-3 and 10-4 are the same. As a result, the image sensor 100 can generate an image with sensitivity that is equivalent between each of the pixels.

Figure 7:
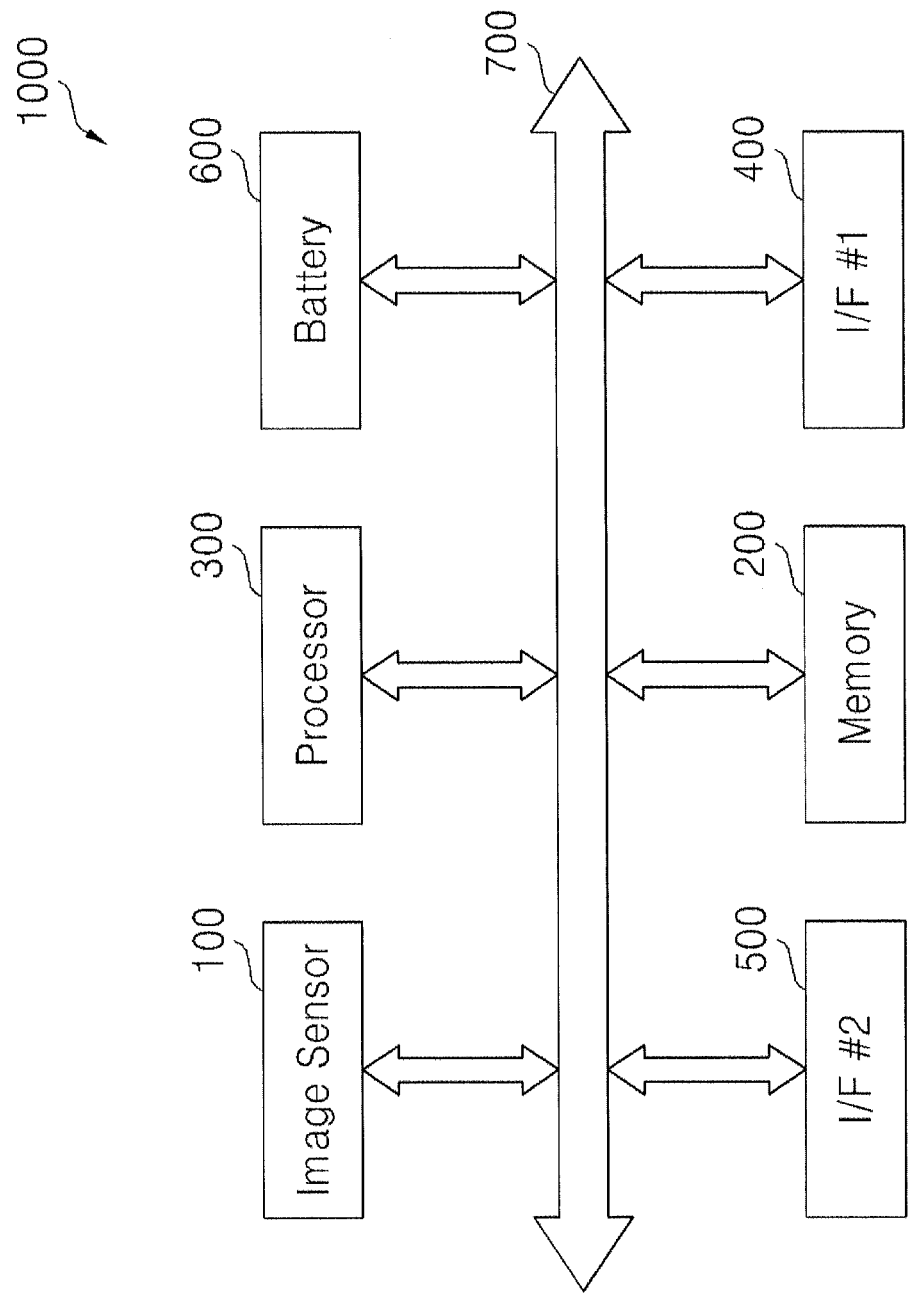
FIG. 7 is a schematic block diagram of an image processing system including the backside illumination image sensor illustrated in FIG. 1 according to some embodiments of the inventive concepts.

FIG. 7 is a schematic block diagram of an image processing system 1000 according to one or more example embodiments of the inventive concepts. Referring to FIG. 7, the image processing system 1000 may include the BSI image sensor 100 as illustrated in FIG. 1, a memory device 200, and a processor 300 which may be connected to a system bus 700.

The processor 300 may generate a plurality of control signals for controlling the operations of the BSI image sensor 100 and the memory device 200. The BSI image sensor 100 may generate an image corresponding to an object and the memory device 200 may store the image generated by the BSI image sensor 100. When the image processing system 1000 is implemented as a portable application, the image processing system 1000 may also include a battery 600 which is configured to supply operating power to the BSI image sensor 100, the memory device 200 and the processor 300.

The portable application including the BSI image sensor 100 may be a portable computer, a digital camera, a personal digital assistant (PDA), a mobile telephone, a smart phone or a tablet personal computer (PC).

The image processing system 1000 may also include an interface 400, e.g., an input/output unit, to communicate data with an external data processing device (not shown). When the image processing system 1000 is a wireless system, the image processing system 1000 may also include a wireless interface 500. The wireless system may be a portable computer, a mobile telephone, a smart phone, a tablet PC or a digital camera. The wireless system may also be a wireless local area network (WLAN) system or a wireless personal area network (WPAN) system.

Figure 8:
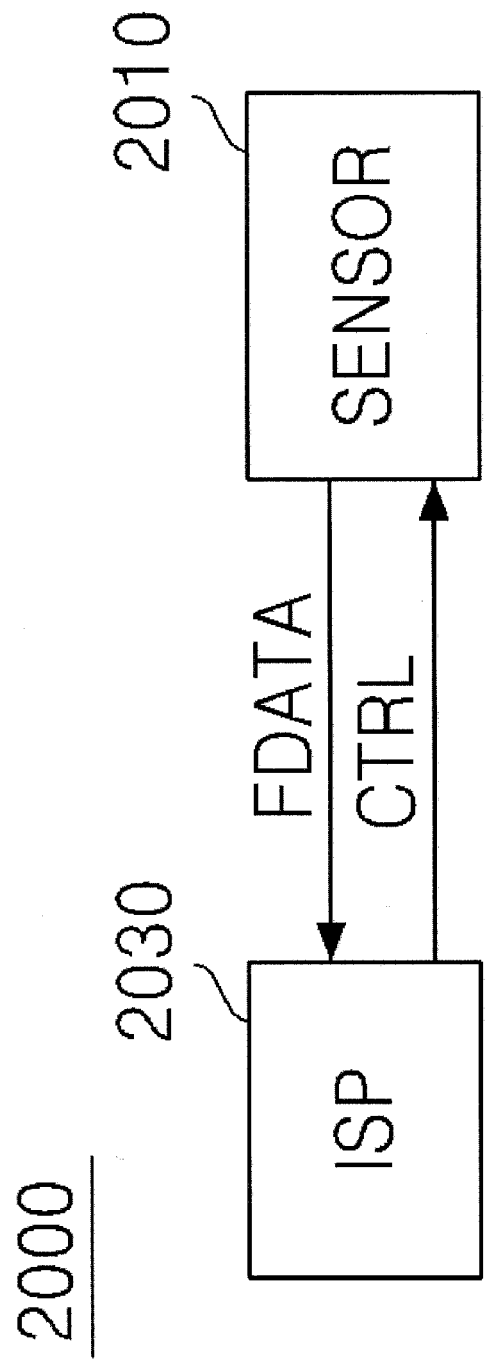
FIG. 8 is a block diagram of an image processing system according to one or more other example embodiments of the inventive concepts.

FIG. 8 is a block diagram of an image processing system 2000 according to one or more other example embodiments of the inventive concepts. Referring to FIG. 8, the image processing system 2000 includes an image sensor 2010 and an ISP 2030.

The image sensor 2010, e.g., a complementary metal oxide semiconductor (CMOS) image sensor, may convert an optical image signal received from an object into an electrical image signal (or electrical image data) and output the electrical image signal, i.e., frame data FDATA. The image sensor 2010 may also output next frame data, the brightness of which has been adjusted in response to a brightness control signal CTRL output from the ISP 2030. In detail, the image sensor 2010 may control the brightness of the next frame by adjusting a charge integration time or adjusting a gain of an analog-to-digital converter (ADC) block included therein in response to the brightness control signal CTRL.

For clarity of the description, a method of adjusting the charge integration time and a method of adjusting the gain of the ADC block are explained, but the technical ideas of the inventive concepts is not restricted thereto. The charge integration time is a period of time from the moment when a pixel starts to receive light after being reset to the moment when the pixel reads the amount of accumulated charges.

The ISP 2030 may receive the frame data FDATA, calculate the average brightness of a frame defined by the frame data FDATA, and output the brightness control signal CTRL for controlling the brightness of a next frame based on the calculated average brightness.

The ISP 2030 and the image sensor 2010 may be packaged in a single package, e.g., a multi-chip package. The image processing system 2000 may be implemented as a digital camera, a digital single-lens reflex (DSLR) camera, a mobile telephone, a smart phone, a tablet PC or a handheld device.

Figure 9:
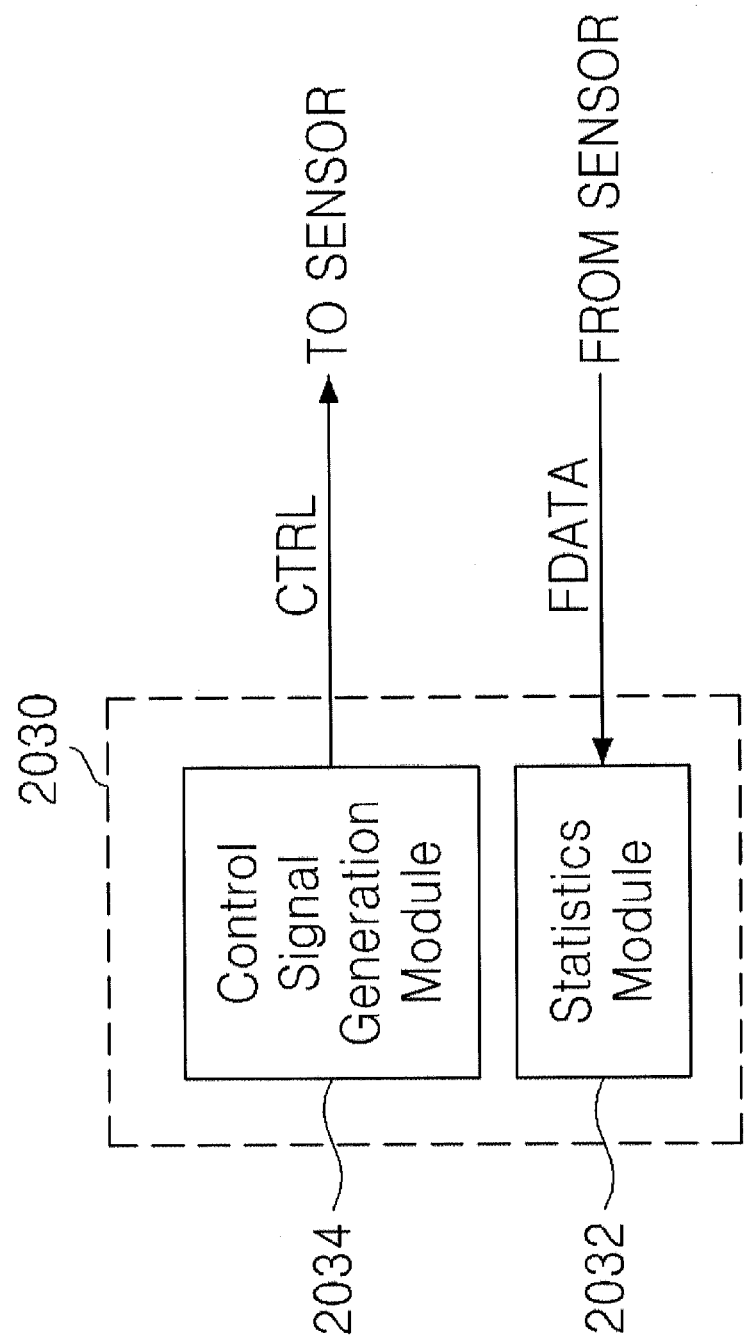
FIG. 9 is a block diagram of an image signal processor (ISP) illustrated in FIG. 8.

FIG. 9 is a block diagram of the ISP 2030 illustrated in FIG. 8. Referring to FIGS. 8 and 9, the ISP 2030 includes a statistics module 2032 and a control signal generation module 2034.

The statistics module 2032 may receive the frame data FDATA from the image sensor 2010 and calculate the average brightness of the frame defined by the frame data FDATA. The control signal generation module 2034 may receive an output signal, i.e., the average brightness of the frame from the statistics module 2032, compare the average brightness with a reference brightness, and generate the brightness control signal CTRL based on the result of comparing the average brightness of the frame with a reference brightness.

For instance, when the average brightness of the frame is greater than the reference brightness, the control signal generation module 2034 may output the brightness control signal CTRL that decreases the brightness of the next frame. When the average brightness of the frame is less than the reference brightness, the control signal generation module 2034 may output the brightness control signal CTRL that increases the brightness of the next frame. The brightness control signal CTRL may be a digital signal including a plurality of bits.

The elements of the ISP 2030 illustrated in FIG. 9 may be functionally and/or logically separated from each other. This does not mean that the elements must be separated into separate physical devices or composed in separate codes.

Here, the module may signify hardware for carrying out the technical ideas of the inventive concepts, and/or the functional and/or structural combination of the hardware and software for driving the hardware. For instance, the module may signify a specific code and a logical unit of a hardware resource for executing the specific code but does not necessarily signify a physically connected code or only one type of hardware.

Figure 10:
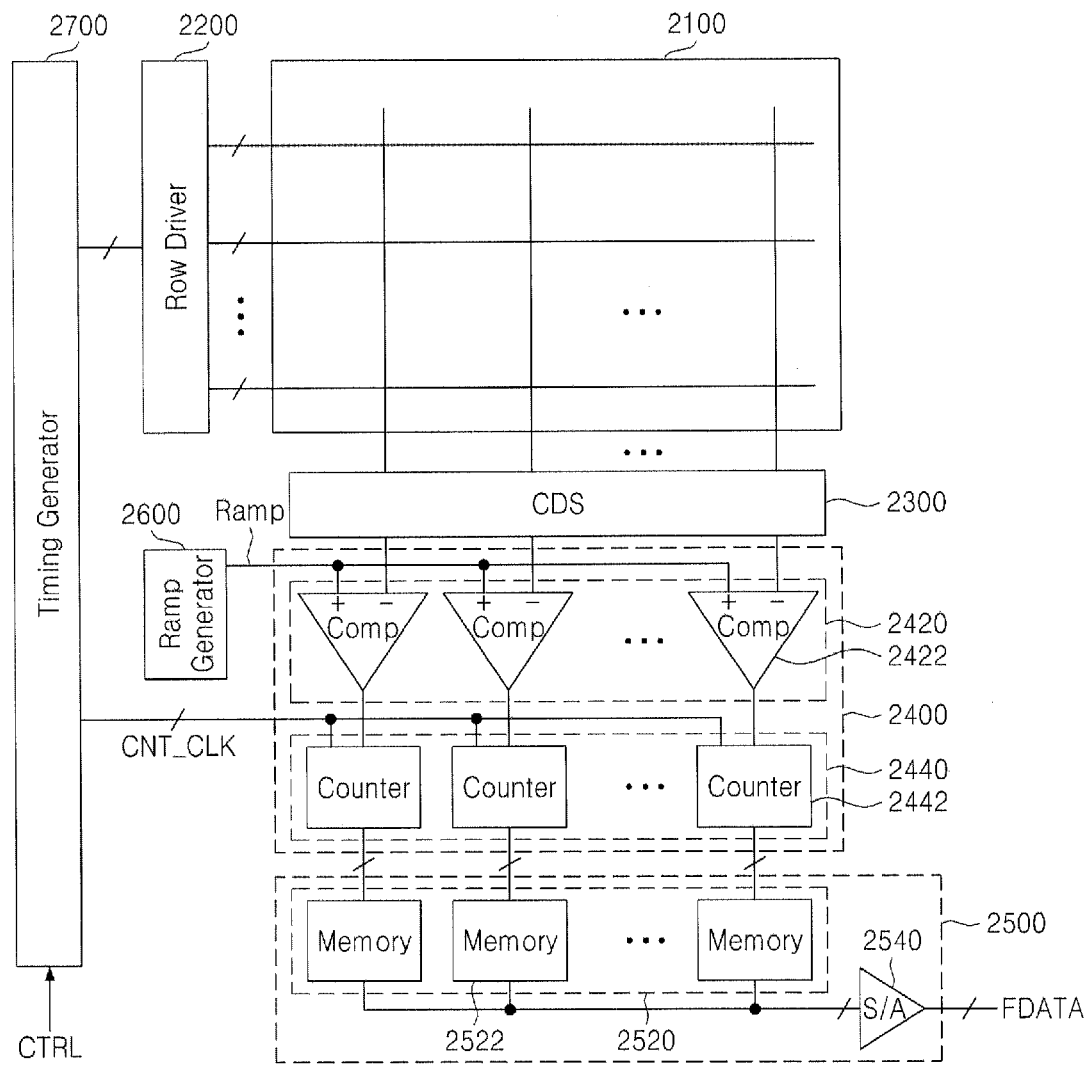
FIG. 10 is a block diagram of an image sensor illustrated in FIG. 8.

FIG. 10 is a block diagram of the image sensor 2010 illustrated in FIG. 8. Referring to FIGS. 8 through 10, the image sensor 2010 may include a pixel array 2100, a row driver 2200, a CDS block 2300, an ADC block 2400, a buffer 2500, a ramp generator 2600 and a timing generator 2700.

The timing generator 2700 may output control signals to adjust either the charge integration time of the pixel, or alternatively, the gain of an amplifier in the ADC block 2400 according to the brightness control signal CTRL so that the brightness of a frame is adjusted, as discussed below.

The pixel array 2100 may include a plurality of pixels arrange in a matrix form. Each of the pixels may convert light in a certain spectrum into an electrical signal. On each pixel may be arrayed a color filter which transmits the light in the certain spectrum.

The row driver 2200 may generate a plurality of control signals for controlling photo detection of each of pixels under the control of the timing generator 2700. The row driver 2200 may drive pixels in units of rows. In addition, the row driver 2200 may adjust the charge integration time of each pixel under the control of the timing generator 2700. For instance, when the row driver 2200 increases the charge integration time, the image sensor 2100 may output next frame data whose brightness has been increased. However, when the row driver 2200 decreases the charge integration time, the image sensor 2100 may output next frame data whose brightness has been decreased.

The CDS block 2300 may perform correlated double sampling CDS on a signal output from the pixel array 2100 in response to control signals output from the timing generator 2700.

The ADC block 2400 may perform analog-to-digital conversion on CDS signals and output digital signals. The ADC block 2400 may include a comparison block 2420 and a counter block 2440. The comparison block 2420 may include a plurality of comparators 2422 each of which is connected with the CDS block 2300 and the ramp generator 2600. The CDS block 2300 and the ramp generator 2600 may be respectively connected to a first input terminal and a second input terminal of each comparator 2422.

The comparator 2422 may receive and compare an output signal of the CDS block 2300 with a ramp signal generated by the ramp generator 2600 and output a comparison signal. The comparison signal output from the comparator 2422 may correspond to a difference between an image signal changing according to external illumination and a reset signal.

The ramp signal may be used to output the difference between the image signal and the reset signal. The difference between the image signal and the reset signal may be output as a different value according to the slope of the ramp signal. The ramp generator 2600 may operate according to a control signal output from the timing generator 2700.

The counter block 2440 may include a plurality of counters 2442 respectively connected to output terminals of the respective comparators 2422. Each of the counters 2442 counts a time point of transitions of the comparison signal of a comparator 2422 based on a clock signal CNT_CLK output from the timing generator 2700 and may output a digital signal, i.e., a count value. At this time, the clock signal CNT_ CLK may be generated by a counter controller (not shown) disposed within the counter block 2440 or the timing generator 2700 based on a counter control signal generated by the timing generator 2700.

The buffer 2500 may include a column memory block 2520 and a sense amplifier 2540. The column memory block 2520 includes a plurality of memories 2522.

Each of the memories 2522 may operate according to a memory control signal generated by a memory controller (not shown) disposed within the column memory block 2520 or the timing generator 2700 based on a control signal generated by the timing generator 2700. Each of the memories 2522 may be implemented by static random access memory (SRAM).

The column memory block 2520 temporarily stores a digital signal output from each of the counters 2422 and outputs it to the sense amplifier 2540 in response to the memory control signal. The sense amplifier 2540 senses and amplifies the digital signal and outputs the amplified digital signal.

The timing generator 2700 may output control signals for controlling the operations of the elements 2200, 2300, 2400, 2500 and 2600 as discussed above. The timing generator 2700 may control the operations of the elements 2200, 2300, 2400, 2500 and 2600 in response to the brightness control signal CTRL, so that the brightness of a frame is adjusted. In particular, the timing generator 2700 controls the row driver 2200 controlling the operation of each pixel in response to the brightness control signal CTRL, so that the charge integration time of the pixel is adjusted.

Alternatively, the timing generator 2700 may control the gain of an amplifier implemented in each comparator 2422 in the ADC block 2400 in response to the brightness control signal CTRL. For instance, the timing generator 2700 may increase the gain of the amplifiers included in the ADC block 2400, so that the brightness of next frame data is increased. The timing generator 2700 may also decrease the gain of the amplifiers included in the ADC block 2400, so that the brightness of next frame data is decreased.

FIG. 11 is a plan view of the pixel array 2100 illustrated in FIG. 10. Referring to FIGS. 10 and 11, the pixel array 2100 includes a plurality of pixels 2120. The pixels 2120 may be arranged in a 6×8 matrix, but the inventive concepts is not restricted to the number of the pixels 210 in the matrix and the arrangement of the matrix illustrated in FIG. 11. In other words, the number and the arrangement of the pixels 2120 included in the pixel array 2100 may be changed in various ways.

The pixel array 2100 may include a plurality of red pixels R, a plurality of green pixels G, a plurality of blue pixels B and a plurality of white pixels W. The red pixels R may convert light in the red spectrum into an electrical signal. The green pixels G may convert light in the green spectrum into an electrical signal. The blue pixels B may convert light in the blue spectrum into an electrical signal. The white pixels W may convert light in the visible spectrum into an electrical signal.

Figure 12:
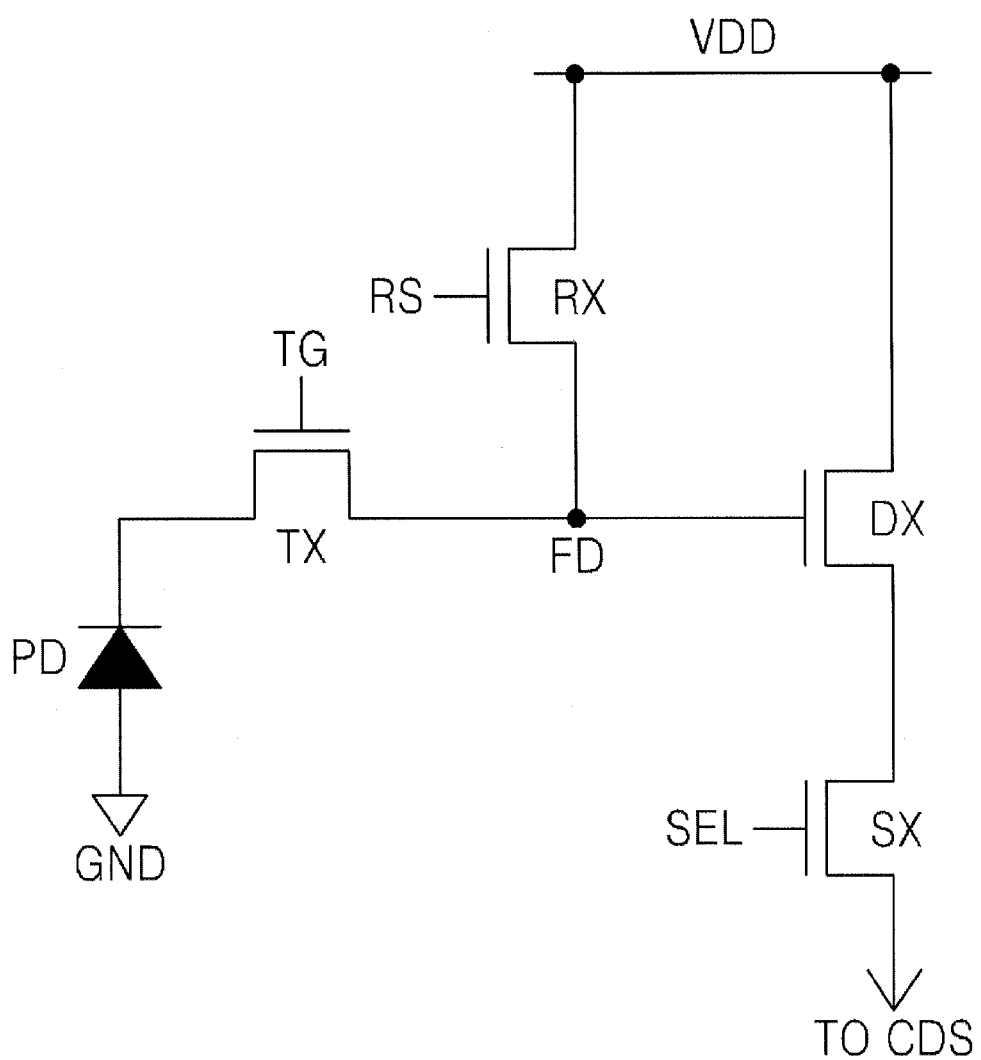
FIG. 12 is a circuit diagram of a pixel illustrated in FIG. 11.

FIG. 12 is a circuit diagram of a pixel 2120 illustrated in FIG. 11. Referring to FIGS. 11 and 12, the pixel 2120 may include a photoelectric conversion element PD, a transfer transistor TX, a reset transistor RX, a drive transistor DX and a select transistor SX. The pixel 2120 may be implemented as a red pixel R, a green pixel G, a blue pixel B or a white pixel W.

The photoelectric conversion element PD is configured to generate photogenerated charges corresponding to light incident on the pixel 2120. The photoelectric conversion element PD may be implemented by a photodiode or a pinned photodiode.

The transfer transistor TX is configured to transfer the photogenerated charges accumulated at the photoelectric conversion element PD to a floating diffusion region FD in response to a transfer control signal TG. The photogenerated charges transferred when the transfer transistor TX is turned-on are accumulated at the floating diffusion region FD.

The reset transistor RX is configured to reset a voltage of the floating diffusion region FD to a level of a power supply voltage VDD in response to a reset signal RS. The drive transistor DX is configured to output an electrical signal corresponding to the amount of photogenerated charges in response to the photogenerated charges transmitted from the floating diffusion region FD. The select transistor SX is configured to output an output signal of the drive transistor DX to the CDS block 2300 in response to a select signal SEL.

The transfer control signal TG, the reset signal RS and the select signal SEL may be generated by the row driver 2200. Since the timing generator 2700 controls the operation of the row driver 2200 according to the brightness control signal CTRL, the activation duration and timing of the transfer control signal TG, the reset signal RS and/or the select signal SEL can be controlled according to the brightness control signal CTRL.

Each of the transistors TX, RX, DX and SX illustrated in FIG. 12 is implemented by an n-type metal oxide semiconductor (NMOS) transistor, but it may be implemented by a p-type metal oxide semiconductor (PMOS) transistor in other embodiments. The pixel 2120 illustrated in FIG. 12 has a structure including a single photoelectric conversion element and four transistors in the example embodiment illustrated in FIG. 12, but it may have a structure including three or five transistors in other example embodiments.

Figure 13:
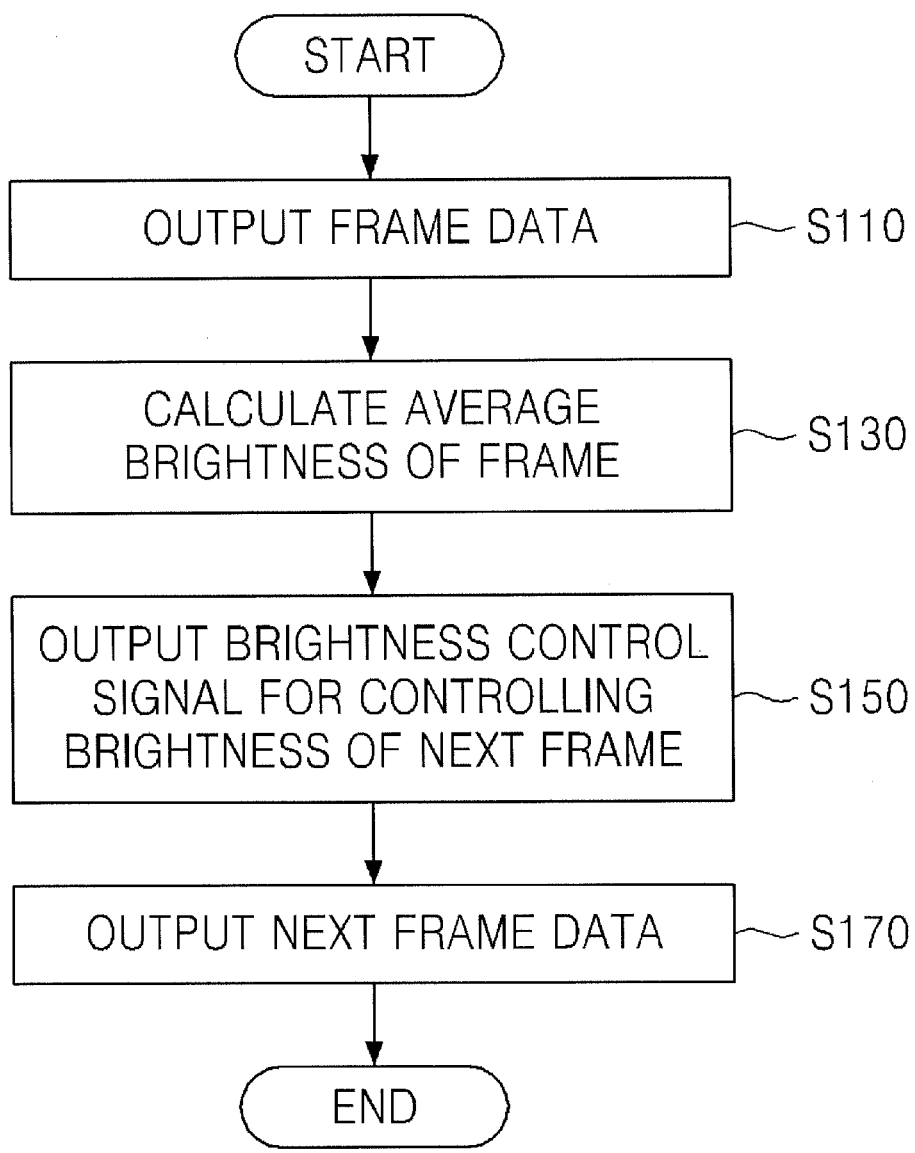
FIG. 13 is a flowchart of a method of processing an image according to some embodiments of the inventive concepts.

FIG. 13 is a flowchart of a method of processing an image according to one or more example embodiments of the inventive concepts.

Referring to FIGS. 8 and 13, the image sensor 2010 is configured to convert an optical image signal received from an object into an electrical image signal, processes the electrical image signal and output frame data FDATA to the ISP 2030 in operation S110.

The ISP 2030 is configured to receive the frame data FDATA and calculate the average brightness of a frame defined by the frame data FDATA in operation S130. Thereafter, the ISP 2030 compares the average brightness of the frame with a reference brightness and outputs a brightness control signal CTRL for controlling the brightness of a next frame to the image sensor 2010 according to the comparison result in operation S150.

For instance, when the average brightness of the current frame is greater than the reference brightness, the ISP 2030 is configured to output the brightness control signal CTRL that decreases the brightness of the next frame to the image sensor 2010. When the average brightness of the current frame is less than the reference brightness, the ISP 2030 is configured to output the brightness control signal CTRL that increases the brightness of the next frame to the image sensor 2010.

The image sensor 2010 is configured to control charge integration time and/or the gain of an amplifier according to the brightness control signal CTRL. Accordingly, the image sensor 2010 outputs the next frame whose brightness has been adjusted in response to the brightness control signal CTRL to the ISP 2030 in operation S170.

A BSI image sensor and an operating method of the same according to some embodiments of the inventive concepts control a transfer control signal so that each of a plurality of pixels in a pixel array has a different effective integration time depending on the type of pixel, thereby providing images with good sensitivity.

An image processing system according to some embodiments of the inventive concepts controls the brightness of a next frame based on the average brightness of a current frame. In addition, the image processing system prevents a pixel with high sensitivity from being saturated.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. An image processing system comprising:
   an image sensor configured to convert an optical image signal into electrical image data and output frame data, the image sensor including an analog-to-digital converter and a timing generator, the analog-to-digital converter configured to convert the optical image signal into the electrical image data such that the electrical image data is a digital representation of the optical image signal having a gain associated therewith, and the timing generator is configured to control the gain of the analog-to-digital converter in response to a brightness control signal; and
   an image signal processor configured to receive the frame data, calculate an average brightness of a frame defined by the frame data, and output the brightness control signal to control a brightness of a next frame based on the average brightness, such that the brightness of a next frame data output by the image sensor is adjusted in response to the brightness control signal.

2. The image processing system of claim 1, wherein the image sensor adjusts a charge integration time in response to the brightness control signal to adjust the brightness of the next frame.

3. The image processing system of claim 1, wherein the image signal processor comprises:
   a statistics module configured to calculate the average brightness of the frame; and
   a control signal generation module configured to generate the brightness control signal according to a comparison of the average brightness with a reference brightness.

4. The image processing system of claim 1, wherein the image sensor further comprises:
   a pixel array including a plurality of pixels configured to convert the optical image signal into the electrical image data;
   a row driver configured to output a plurality of control signals for controlling the pixels in response to the brightness control signal;
   a correlated double sampling block configured to perform correlated double sampling on the electrical image data;
   a buffer configured to receive the electrical image data output from the analog-to-digital converter block and output the frame data,
   wherein the analog-to-digital converter is configured to convert an output signal of the correlated double sampling block into the electrical image data.

5. The image processing system of claim 1, wherein the image processing system is a digital single-lens reflex camera.

6. The image processing system of claim 1, wherein the image processing system is a handheld device.

7. The image processing system of claim 1, wherein the image sensor and the image signal processor are packaged in a single package.

* * * * *